United States Patent
Degenhardt et al.

(10) Patent No.: US 7,643,516 B2
(45) Date of Patent: Jan. 5, 2010

(54) METHOD AND ARRANGEMENT FOR COMPENSATING FOR JITTER IN THE DELAY OF DATA PACKETS

(75) Inventors: Achim Degenhardt, Munich (DE); Daniel Goryn, München (DE)

(73) Assignee: Infineon Technologies AG, Munich (DE)

( * ) Notice: Subject to any disclaimer, the term of this patent is extended or adjusted under 35 U.S.C. 154(b) by 494 days.

(21) Appl. No.: 11/203,436

(22) Filed: Aug. 12, 2005

(65) Prior Publication Data

US 2006/0034338 A1     Feb. 16, 2006

(30) Foreign Application Priority Data

Aug. 12, 2004    (DE)    .................. 10 2004 039 186

(51) Int. Cl.
*H04J 3/06*    (2006.01)
(52) U.S. Cl. .................................................. 370/516
(58) Field of Classification Search ................. 370/516, 370/517, 229, 230, 412, 415, 519
See application file for complete search history.

(56) References Cited

U.S. PATENT DOCUMENTS

| 5,933,414 | A | * | 8/1999 | Georgiadis et al. .......... 370/238 |
| 5,966,387 | A | | 10/1999 | Cloutier |
| 6,259,677 | B1 | | 7/2001 | Jain |
| 6,674,726 | B1 | * | 1/2004 | Kado et al. .................. 370/253 |
| 6,763,274 | B1 | * | 7/2004 | Gilbert ........................ 700/94 |
| 6,985,501 | B2 | * | 1/2006 | Suzuki et al. ............... 370/517 |
| 7,268,824 | B2 | * | 9/2007 | Suzuki ........................ 348/497 |
| 2003/0152094 | A1 | | 8/2003 | Colavito et al. |
| 2006/0039412 | A1 | * | 2/2006 | Degenhardt et al. ......... 370/516 |

\* cited by examiner

*Primary Examiner*—Steven H Nguyen
*Assistant Examiner*—Anh Ngoc Nguyen
(74) *Attorney, Agent, or Firm*—Maginot, Moore & Beck

(57) ABSTRACT

To compensate for jitter in the delay of data packets (1) which are transmitted over a transmission link (40), e.g. a data network, the data packets (1) are buffer-stored in a jitter buffer (10) and are then played out of the jitter buffer (10) at preset intervals of time, after an additional play-out delay ($\Delta T$). The additional play-out delay ($\Delta T$) is set in this case as a function of a magnitude that is determined of the delay jitter, for which purpose differences in delay between successive data packets (1) are determined and an integrated value of the differences in delay is formed by integration. The additional play-out delay ($\Delta T$) is then set on the basis of the integrated value of the differences in delay.

19 Claims, 3 Drawing Sheets

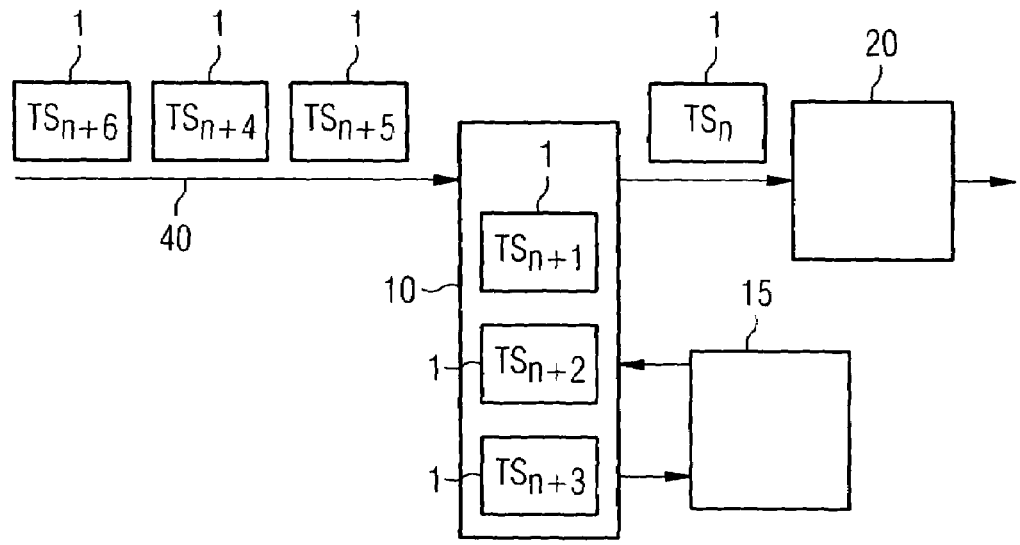
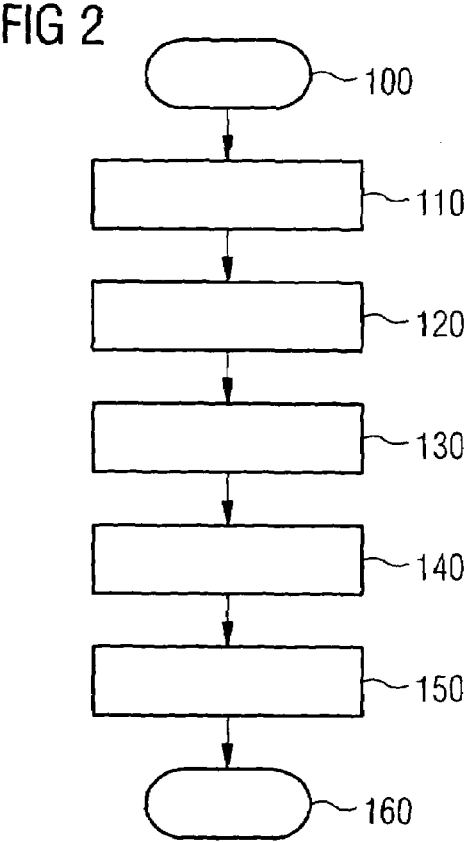

METHOD AND ARRANGEMENT FOR COMPENSATING FOR JITTER IN THE DELAY OF DATA PACKETS

Cross-reference is made to co-pending application entitled "Method and Device for Compensating for Runtime Fluctuations of Data Packets Packets", filed on even date herewith, and which is incorporated herein by reference.

FIELD OF THE INVENTION

The present invention relates to a method and an arrangement for compensating for jitter in the delay of data packets, and in particular of data packets transmitted on a data network which is used for example to transmit speech data.

BACKGROUND

When speech data is transmitted over packet-switched data networks, the speech data is divided into individual data packets and communicated over the data network. The delay to which the data packets are subject when they are transmitted by the data network, or in other words their transit time, may change to different values in this case, i.e. although the data packets are emitted by a transmitter at regular intervals of time, they are not received by a receiver at these same regular intervals of time. It is even possible that the data packets may not arrive in the same sequence as that in which they were emitted by the transmitter. Hence, jitter occurs in the delay of the data packets when they are transmitted by the network. This jitter could also be described as fluctuations in transit time. The greater the jitter, i.e. the greater the fluctuations in transit time, the greater may be the difference in time between an ideal time of arrival of a data packet at the receiver, i.e. the time of arrival that the data packet would have in a data network whose delay was fixed, and the actual time of arrival.

To compensate for such delay jitter, what is normally used is a buffer store in the form of what is termed a jitter buffer, which provides an additional delay for the data packets to compensate for the delay jitter to which the data packets are subject. Where required, the data packets are also restored to their original sequence.

The procedure in this case is, in principle, to buffer store received data packets in the jitter buffer and to play the buffer-stored data packets out of the jitter buffer again at regular intervals, after an additional play-out delay. What the play-out delay is intended to ensure in this case is that the data packet which has to be played out at any given time is in fact, as far as possible, always available in the jitter buffer.

The size of the additional play-out delay for a data packet depends on when the data packet actually arrived. The greater is the difference in time between the arrival of the data packet at the jitter buffer and the intended play-out time, the greater too is the additional play-out delay that is needed for the data packet. The play-out delay should correlate in this case with the severity of the delay jitter on the data network, i.e. the greater is the delay jitter, the greater too must be the play-out delay selected, to prevent data packets from having to be discarded because they arrived later than their intended play-out time. The intended play-out time is defined by the fact that a unit to which the data packets are played out, such for example as a decoder for converting the data packets into speech data, having processed one data packet expects the next data packet for processing at a preset interval of time. If the data packet in question is not available in the jitter buffer, the missing data has to be replaced, by interpolation for example, and there is a drop in the quality with which the speech data is transmitted.

When speech data is transmitted over packet-switched data networks, the sum of all the delays on the data network has a considerable effect on the quality of the speech data that is transmitted. This is particularly important for telephone applications based on data networks, e.g. what is called IP telephony. It has been found in this case that there is a significant decrease in quality for two-way speech over the data network if the sum of all the delays on the data network exceeds 150 ms.

For this reason, it is important for the play-out delay applied by the jitter buffer to compensate for the delay jitter to be kept as short as possible. What has to be ensured in this case is that the play-out delay to the data packets is, on the one hand, as short as possible, but on the other hand is sufficiently long not to cause an excessive increase in the number of data packets which arrive later than their intended play-out time and consequently have to be discarded.

The delay jitter which typically occurs on packet-switched data networks is generally subject to variations in its severity over time. To stop the play-out delay applied by the jitter buffer from having to be attuned to the worst-case network conditions, i.e. to the most severe delay jitter affecting the data packets, the play-out delay applied by the jitter buffer may be corrected, i.e. adjusted to the network conditions, adaptively. This stops the quality of the speech communication from being degraded unnecessarily due to a play-out delay which is selected to be of a level which is too high in the majority of cases. Jitter buffers of this kind which are able to adjust their play-out delay adaptively to network conditions are called adaptive jitter buffers.

To adjust the play-out delay applied by the jitter buffer, it is known for the jitter in the delay of the data packets to be determined from the variations in the delay of the data packets. The variations in the delay of the data packets are also referred to as packet delay variation.

It is typical of data networks which are subject to delay jitter that the delay suffered by individual data packets across the data network varies. Because the total delay which a data packet experiences when travelling through the data network, i.e. its total transit time, is generally not known or can be determined only with considerable effort, it is not the total delay of the data packets on the data network that is normally determined to allow delay jitter to be established but instead it is the relative difference in delay between two successive data packets that is taken as a basis for establishing the said delay jitter. The relative difference in delay between two successive data packets is often termed packet-to-packet delay variation. The relative difference in delay between two successive data packets can be found with comparatively little effort by reference to a local clock at the receiver of the data packets.

In what follows, an example will be described of the calculation of the relative difference in delay between two successive data packets. The relative difference in delay between data packets which belong to a sequence of data packets which are identified by the subscripts n=0, 1, 2 . . . will be referred to here as the PPDV (packet-to-packet delay variation). The time of arrival of the data packet having the subscript n will be called $t_n$. This is the time, given by the local clock at the receiver, at which the data packet of subscript n arrived at the jitter buffer. In the same way, the time at which the next data packet arrived is called $t_{n+1}$. If the period of time which corresponds to the data contained in the data packet is called $d_n$, then the formula for the difference in delay between the data packet of subscript n and the data packet of subscript n+1 is:

$$PPDV=(t_n+d_n)-t_{n+1}.$$

In the formula, $t_n+d_n$ is the time at which the data packet of subscript n+1 ought to arrive if the said data packet of subscript n+1 were to encounter exactly the same delay on the data network as was encountered by the data packet of subscript n. The mean of the differences in delay which are calculated in this way is referred to as the mean packet-to-packet delay variation and is an approximation of the delay jitter experienced by data packets when travelling through the data network.

The data packets do not have to arrive in this case in the same sequence as that in which they were emitted by the transmitter. Something that is frequently found on data networks is that the data packets arrive out of order. For the above-described method of calculating the difference in delay, it is not essential for the times of arrival $t_n$ of the data packets to be sorted to enable the differences in delay to be calculated. Instead, to save on calculating work, the difference in delay can generally be calculated from:

$$PPDV=(t_n+d_n)-t_{n+m}$$

In this formula, m can be both positive and negative and is determined in such a way that $t_{n+m}$ is the time of arrival of the data packet which arrives immediately after the data packet of subscript n. If the data packets arrive in the same sequence as that in which they are emitted by the transmitter, then m=1.

Other methods of calculating the differences in delay between two successive data packets are generally predicated on the presence of additional items of information in the data packets, such for example as a time marker in the form of a so-called timestamp, which represents the time of transmission or generation of the data packet as given by the clock. The calculation of the differences in delay between two successive data packets on the basis of the timestamp of the data packets and the times of arrival of the data packets at the receiver is defined for example in specification RFC 1889. For the calculation of the instantaneous delay jitter, provision is also made in this specification for a mean to be formed of the values calculated for the differences in delay of two successive data packets at a time, the mean being formed by a first order low-pass filter. The time constant for the low-pass filter is also defined in the specification. By means of this known method, it is possible to obtain a value which represents the mean size of the delay jitter which is occurring instantaneously on the data network.

However, if the value for the delay jitter on the data network that is determined in this way is used to determine the additional play-out delay applied by the jitter buffer, a problem arises in that the delay jitter is typically not evenly distributed. Instead, spells of increased delay jitter, which are termed jitter bursts, occur at intervals of time of greater or lesser regularity. Allowance has to be made for these jitter bursts when calculating the additional play-out delay applied by the jitter buffer. This may for example be done by multiplying the mean value for the delay jitter which is determined by the above method by a factor which is intended to make allowance for the actual distribution of the delay jitter. However, because this factor is preset at a fixed value, it has to be designed to cater for the worst-case distribution of the delay jitter, which means that what is generally obtained is an additional play-out delay which is appreciably longer than is actually necessary.

A different approach is known from, for example, U.S. Pat. No. 6,259,677 B1, in which the minimum delay of a data packet through the data network is determined. The total delays of the data packets through the data network can be determined on the basis of this minimum delay. From the total delays which have been determined in this way, a metric can be determined in turn for the delay jitter when the data packets are transmitted through the data network. However, on the one hand there is in this case the problem that the minimum delay through the network may change during the transmission of the data packets between the transmitter and receiver. If this happened, the calculation of the total delays, or rather of the differences in the total delays, would be affected by an error because it might under certain circumstances no longer be possible for the minimum delay previously determined still to be achieved. On the other hand, even with this method there are certain conditions that the distribution of the delay jitter has to meet, which means that in this case too the metric determined for the delay jitter has to have a safety factor applied to it to make allowance for the distribution of the network delay jitter.

SUMMARY

Hence, it is an object of the present invention to provide a method and an arrangement for compensating for jitter in the delay of data packets which, in an easy and reliable manner, make it possible for the additional play-out delay applied by the jitter buffer to be adjusted to the delay jitter which occurs on the data network.

Provision is made in accordance with the invention for the delay jitter of data packets to be compensated for by buffer storing the data packets which are transmitted over a transmission link in a jitter buffer. The data packets which have been buffer-stored are then played out of the jitter buffer at preset intervals of time, and after an additional play-out delay, thus compensating for the jitter in the delay of the data packets. What is obtained in this case is a shorter residence time in the jitter buffer for data packets having a longer total delay over the transmission link and a longer residence time in the jitter buffer for data packets having a shorter total delay over the transmission link. The data packets may in particular be ones which communicate speech data, e.g. in the context of data-network-based communication of speech data. What may specifically be involved in this case is a so-called voice-over-IP application or an IP telephony application. The transmission link may thus be formed in particular by a data network or part of a data network.

Provision is made in accordance with the invention for the differences in delay of the data packets to be determined relative to the respective preceding data packets, on the basis for example of a local clock in the receiver and a period of time corresponding to the data encoded in the data packets. The preceding data packet may be the data packet which was transmitted immediately beforehand or the data packet which arrived in the jitter buffer immediately beforehand. The differences in delay which are determined are integrated to give an integrated value of the differences in delay. The additional play-out delay applied by the jitter buffer is then set as a function of the integrated value of the differences in delay.

This gives the advantage that what is obtained with the integrated value for the differences in delay is a variable which reflects the optimum way of behaving for the additional play-out delay applied by the jitter buffer. In the event of the data packets arriving at an accelerated rate for example, the value of the integrated difference in delay rises, because a positive difference in delay is always found between two successive data packets. A similar pattern of behaviour would be found for the loading of the jitter buffer. The number of data packets in the jitter buffer would rise in this case. If on the other hand the data packets arrived at a decelerated rate, the difference in delay between two successive data packets would always be negative and hence the value of the integrated difference in delay would become smaller. This too would correspond to the behaviour found for the loading of the jitter buffer. The number of data packets in the jitter buffer would decrease in this case. Because the integrated difference in delay thus reflects the intended pattern of behaviour for the loading of the jitter buffer and hence too the pattern of behaviour of the optimum play-out delay, the additional play-out delay applied by the jitter buffer can be set with particular advantage on the basis of the integrated difference in delay. Because the integrated value of the differences in delay is also affected by extreme delay jitter, a non-uniform distribution of the delay jitter is allowed for too by the procedure according to the invention.

In accordance with the invention, the differences in delay are preferably determined as relative differences in delay relative to the respective preceding data packets. However, alternatively or in addition, it is also possible for the differences in delay to be determined as total differences in delay, on the basis for example of a minimum delay for the data packets. This means that the particular total delay of a data packet from the receiver to the transmitter becomes involved in the determination of the differences in delay. When this is the case, the time of transmission may for example be determined from a so-called timestamp.

To enable the calculation of the additional play-out delay on the basis of the integrated value of the differences in delay to be adjusted to network conditions with greater flexibility, it is preferable for a minimum and a maximum extreme value to be detected for the integrated value of the differences in delay and for the additional play-out delay to be set not directly on the basis of the integrated value of the differences in delay but as a function of the minimum and maximum extreme values that are detected. What are preferably used for detecting the minimum and maximum extreme values of the integrated value of the differences in delay in this case are, in the respective cases, a minimum-value detector and a maximum-value detector. The minimum-value detector is so arranged in this case that it goes to a new value if the integrated value of the differences in delay which is detected is below the instantaneous value at the minimum-value detector. The maximum-value detector is so arranged that it goes to a new value if the integrated value of the differences in delay which is detected exceeds the instantaneous value at the maximum-value detector. The play-out delay can then be set as a function of the value at the minimum-value detector and the value at the maximum-value detector.

The use of the minimum-value detector and the maximum-value detector gives the advantage that time constants for the adoption of a new value can be so defined that a new extreme value is adopted comparatively quickly, whereas in cases where new extreme values for the integrated difference in delay are not being detected, the values at the time at the minimum value detector and maximum-value detector are corrected comparatively slowly. The adoption of the new extreme values preferably takes place at an infinitely fast rate, i.e. immediately. The correction, i.e. a gradual increase in the value at the minimum-value detector and a gradual reduction in the value at the maximum-value detector when new extreme values are not being detected in the respective cases, preferably takes place only when fresh data packets have arrived and hence there is also fresh information available for evaluating the differences in delay. This provides a way of avoiding any maladjustment of the additional play-out delay in phases in which there is less transmitting activity, such for example as in pauses in speech in the course of a two-way transmission of speech data.

The additional play-out delay applied by the jitter buffer is preferably set as a function of the difference between the value at the maximum-value detector and the value at the minimum-value detector. This difference corresponds to the greatest delay jitter which occurs within a given interval of time. If the additional play-out delay is set to this value, it is thus set to a value which is as low as possible. A low value for the additional play-out delay in turn ensures an optimum quality of transmission for speech data in the context of a two-way transmission of speech data, in a voice-over-IP application for example.

However, to provide additional security against underflow or emptying of the jitter buffer, the difference between the value at the maximum-value detector and the value at the minimum-value detector is preferably increased by an extra amount so that, as far as possible, the delay jitter is not underestimated. The extra amount for increasing the difference may be applied in this case in the form of a multiplicative factor or an additive extra amount. In both cases it is possible for the extra amount to be preset in a fixed form or to be adjusted adaptively. An adaptive adjustment of this extra amount makes it possible in this case for a suitable compromise to be made between an additional play-out delay which is as short as possible and, at the same time, high security against the jitter buffer underflowing or emptying.

An arrangement according to the invention for compensating for jitter in the delay of data packets comprises storage means in the form of a jitter buffer for buffer storing data packets received over a transmission link and is arranged such that the buffer-stored data packets are played out of the jitter buffer at preset intervals of time, after an additional play-out delay. In accordance with the invention, the arrangement is provided with control means which are arranged to determine the differences in delay of the data packets relative to the respective preceding data packets, to integrate the differences in delay in order to obtain an integrated value of the differences in delay, and to set the additional play-out delay as a function of the integrated value of the differences in delay. This is preferably done by the method according to the invention as described above.

The arrangement may for example be supplied in the form of a computer system having suitable software, but may also be implemented by means of suitable hardware. It is possible in particular for the arrangement to be used in devices designed specifically for the data-network-based communication of speech data, e.g. so-called IP telephones.

The present invention enables allowance to be made in a particularly effective way for the delay jitter which occurs on a data network, by the setting of the additional play-out delay applied by the jitter buffer to compensate for the delay jitter. What in particular are also allowed for by the present invention by the setting of the play-out delay are transient phases in which the delay jitter is especially severe, without this resulting in the additional play-out delay being set to a sustained value which is unnecessarily high.

The invention will be explained in detail below by reference to a preferred embodiment and to the accompanying drawings.

BRIEF DESCRIPTION OF THE DRAWINGS

FIG. 1 shows an arrangement for compensating for jitter in the delay of data packets in accordance with an embodiment of the invention.

FIG. 2 is a flow chart to illustrate a method of setting a play-out delay for data packets in accordance with an embodiment of the invention.

DETAILED DESCRIPTION

Figure 3A:
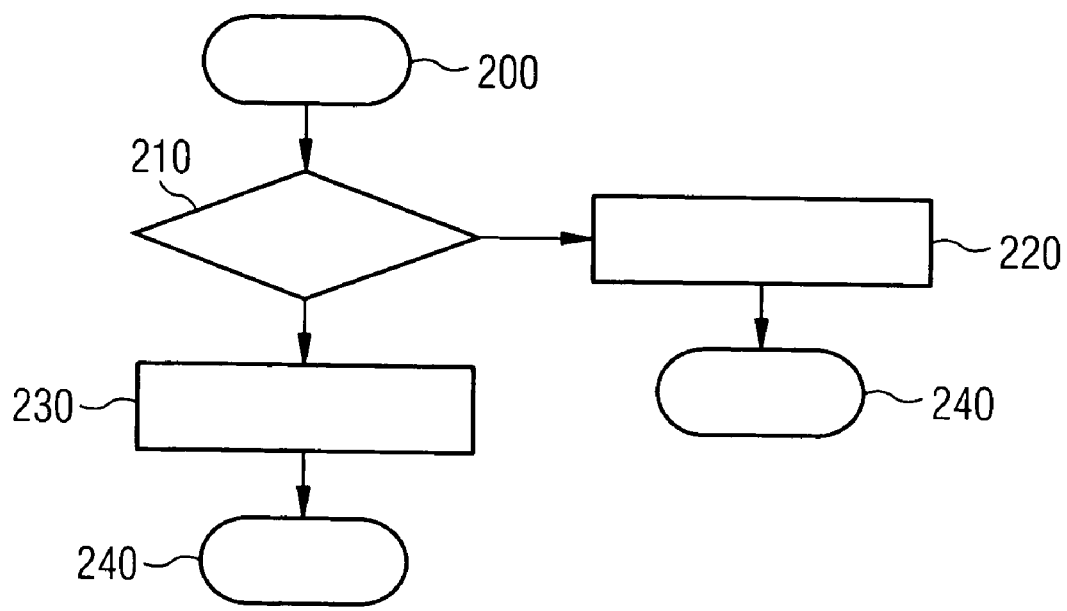
FIG. 3 shows flow charts illustrating the implementation of a maximum-value detector and a minimum-value detector, with FIG. 3(a) relating to the implementation of the maximum-value detector and FIG. 3(b) to that of the minimum-value detector.

FIG. 1 is a schematic view of an embodiment of an arrangement for compensating for jitter in the delay of data packets 1, which arrangement is based on a buffer store which is arranged as a jitter buffer 10 and is part of a receiver. The data packets 1 are received via a transmission link 40, which is formed by a data network or part of a data network, and are buffer-stored in the jitter buffer 10. The data packets 1 are provided with a timestamp $TS_{n+x}$, the said timestamp reflecting the time at which the data packets 1 were generated or emitted by a transmitter (not shown). The data packets 1 are buffer-stored in the jitter buffer 10 and are then played out of the jitter buffer 10 at preset intervals of time, thus compensating for the delay jitter to which the data packets 1 arriving at the jitter buffer 10 are subject. For this purpose, the jitter buffer 10 applies an additional play-out delay $\Delta T$ which is intended to ensure that the jitter buffer 10 does not empty, i.e. that the data packet 1 which is to be played out at the time is in fact always available in the jitter buffer 10. The timestamp of the data packet 1 which is to be played out at the time is called $TS_n$ and the succeeding timestamps have a correspondingly higher subscript following the pattern x=1, 2, 3 etc.

For each of the data packets 1, the timestamps $TS_{n+x}$ reflect the time at which it is emitted or generated. The data packets 1 encode speech data which is transmitted by the transmitter as a continuous data stream, which means that each of the data packets 1 contains a preset length of speech data and the complete data stream formed by the speech data is obtained by assembling the contents of the individual data packets 1. The length of the speech data encoded in the data packets 1 may be 10 ms or 30 ms for example. The time stamps $TS_{n+x}$ and $TS_{n+x+1}$ of two successive data packets 1 thus differ by the length of the speech data encoded in the data packets 1.

Even though the present embodiment will be discussed below by reference to speech data which is communicated, other data, such as video data for example, may also be communicated by the data packets.

Depending on the transmission protocol employed, the timestamps $TS_{n+x}$ of the data packets 1 may be a direct part of the data packets 1 or may be obtained from components of the data packets 1. In this way, in the case of the so-called RTP protocol for example, a timestamp is contained in a header of the data packets 1. In the case of the so-called AAL protocol, the timestamp $TS_{n+x}$ can be calculated on the basis of the UUI field and the sequence number interval.

The data packets 1 are played out of the jitter buffer 10 to a decoder 20, which decodes the speech data contained in the data packets 1 and re-assembles the speech data into a continuous data stream. For this purpose, it is necessary for the decoder 20 to receive the data packets 1 at given, preset intervals of time which must be of, or more than, a given size. This prevents missing speech data from having to be added in by interpolation, which causes a loss in quality. The preset intervals of time at which the decoder 20 expects data packets 1 are basically dependent on the length of the sets of speech data encoded in the data packets 1.

To avoid data packets 1 not being available in the jitter buffer 10 at their intended play-out time, i.e. the time at which the decoder 20 expects the given data packet 1, the jitter buffer 10 supplies the additional play-out delay $\Delta T$ which is intended to ensure that as many as possible of the data packets 1 arrive at the jitter buffer 10 before their intended play-out time. Because the arrival times of the data packets 1 at the jitter buffer 10 depend on the network conditions, i.e. on the delay to which the data packets 1 are subject at the time through the data network, the play-out delay $\Delta T$ is set, and adjusted to the varying network conditions, by means of a control block 15.

FIG. 2 is a flow chart which illustrates a method of setting the additional play-out delay $\Delta T$ applied by the jitter buffer 10 as a function of the delay jitter which is determined when the data packets 1 are transmitted over the data network.

Provision is made in this case for the relative differences in delay of successive data packets 1 to be detected. In what follows, the relative difference in delay between two successive data packets 1 will be designated PPDV. If the data packets 1 are identified by the progressing subscript n=0, 1, 2 . . . which reflects the sequence of emission, the relative difference in delay between the data packet 1 of subscript n+x and the data packet 1 of subscript n+x+m is calculated from $$PPDV=(t_{n+x}+d_{n+x})-t_{n+x+m}.$$

In this formula, $t_{n+x}$ is the time of arrival at the jitter buffer 10 of the data packet 1 of subscript n+x, and $t_{n+x+m}$ is the time of arrival of the data packet 1 which arrives immediately after the data packet 1 of subscript n+x, i.e. the calculation of the relative difference in delay takes place without the times of arrival having to be ordered in the sequence in which the data packets 1 were emitted by the transmitter. If the data packets 1 arrive in the same sequence as they were emitted by the transmitter, m=1. If a higher value than this is found for m, the data packet 1 of subscript n+x+m is discarded and the relative difference in delay is not analysed.

$d_{n+x}$ is the length in time of the data which is encoded in the data packet 1 of subscript n+x. In the packet-based communication of speech data, this length in time is generally the same for all the data packets 1 and is for example 10 ms or 30 ms. Because the data packets 1 are generated and emitted continuously at the transmitter end, $t_{n+x}+d_{n+x}$ is thus the time at which the data packet of subscript n+x+1 would arrive if the said data packet 1 were subject on the data network to exactly the same delay as the data packet 1 of subscript n+x.

There are however alternative possible ways of calculating the differences in delay of the data packets 1, such for example as on the basis of the timestamps $TS_{n+x}$ of the data packets 1, from the formula:

$$PPDV=(t_{n+x}+TS_{n+x})-(t_{n+x+m}-TS_{n+x+m})$$

or on the basis of the total delay to which the data packets 1 are subject through the data network at the time.

The method of setting the additional play-out delay $\Delta T$ begins, if a fresh data packet 1 has arrived, at the start point 100. Then, in step 110 for determining the difference in delay, the relative difference in delay PPDV of the newly arrived data packet 1 relative to the preceding data packet 1 is determined as described above.

In the integrating step 120, the difference in delay PPDV which has been determined is integrated, i.e. an integrated value $I_{PDDV}$ of the differences in delay is determined. This is done by adding the difference in delay PPDV which is determined to the integrated value $I_{PPDV}$ of the differences in delay at the time. The integrated value $I_{PPDV}$ of the differences in delay is set initially to a desired starting value. As a rule, this starting value is zero, i.e. before the first data packet 1 arrives, $$I_{PPDV}=0.$$

The integrated value $I_{PPDV}$ of the differences in delay is then reset in accordance with $$I_{PPDV}=I_{PPDV}+PPDV$$

for the data packets 1 which arrive subsequently.

Then, in an extreme-value detecting step 130, a minimum and a maximum extreme value of the integrated value $I_{PPDV}$ of the differences in delay are respectively detected by means of a minimum-value detector $PD_{MIN}$ and a maximum-value detector $PD_{MAX}$. After the extreme-value detecting step 130, the value at the minimum-value detector $PD_{MIN}$ is thus the minimum extreme value, which occurred in a given period of time, of the integrated value $I_{PPDV}$ of the differences in delay, and the value at the maximum-value detector $PD_{MAX}$ is the maximum extreme value, which occurred in a given period of time, of the integrated value $I_{PPDV}$ of the differences in delay.

In a correcting step 140, the integrated value $I_{PPDV}$ of the differences in delay, the value at the maximum-value detector $PD_{MAX}$ and the value at the minimum-value detector $PD_{MIN}$ are then each corrected by the instantaneous value at the minimum-value detector $PD_{MIN}$ so that the value at the minimum-value detector $PD_{MIN}$ is then zero. What is ensured in this way is on the one hand that the integrated value $I_{PPDV}$ of the differences in delay, the value at the maximum-value detector $PD_{MAX}$ and the value at the minimum-value detector $PD_{MIN}$ cannot then increase by an unlimited amount over the course of time. An unlimited increase of this kind would for example be caused by differences in timing between the transmitter and the receiver. A difference in timing of this kind between the transmitter and receiver would cause the integrated value $I_{PPDV}$ of the differences in delay, and hence the value at the maximum-value detector $PD_{MAX}$ and the value at the minimum-value detector $PD_{MIN}$ as well, to increase in absolute terms. It is therefore advantageous for a limit to be set for the range of values of the integrated difference in delay $I_{PPDV}$, and for the range of values at the maximum-value detector $PD_{MAX}$ and at the minimum-value detector $PD_{MIN}$.

The correction that is made in the correcting step 140 to the integrated value $I_{PPDV}$ of the differences in delay and to the values at the maximum-value detector $PD_{MAX}$ and the minimum-value detector $PD_{MIN}$ is made in such a way that the relative distances between the individual values, i.e. the differences between them, remain the same. This ensures that, in subsequent analysing steps, new extreme values of the integrated value $I_{PPDV}$ of the differences in delay can be correctly detected and that the determination of the additional play-out delay $\Delta T$ on the basis of the difference between the value at the maximum-value detector $PD_{MAX}$ and the value at the minimum-value detector $PD_{MIN}$ is not jeopardised. Rather, as will be seen below, the determination of the additional play-out delay $\Delta T$ is simplified, because the value at the minimum-value detector $PD_{MIN}$ is set to zero.

In a calculating step 150, an optimised value for the additional play-out delay $\Delta T$ is calculated on the basis of the value at the maximum-value detector $PD_{MAX}$ and the value at the minimum-value detector $PD_{MIN}$. The optimised value for the additional play-out delay $\Delta T$ substantially corresponds in this case to the difference between the value at the maximum-value detector $PD_{MAX}$ and the value at the minimum-value detector $PD_{MIN}$. Provision is however made for an additional safety allowance, which means that the difference is increased by an extra amount. This is done by means of a multiplication factor M, which means that the additional play-out delay $\Delta T$ is then determined from:

$$\Delta T=(PD_{MAX}-PD_{MIN})\cdot M.$$

Alternatively, an additive safety allowance N may be used, which means that when this is the case the additional play-out delay $\Delta T$ is determined by $$\Delta T=(PD_{MAX}-PD_{MIN})+N$$

Limits are set for the values for M and N in this case in such a way that N is greater than zero and M is greater than 1. The safety allowance M or N may be preset at a fixed value, but preferably it is set adaptively as a function of the network conditions.

Because, in the correcting step 140, the value at the maximum-value detector $PD_{MAX}$ and the value at the minimum-value detector $PD_{MIN}$ were corrected such that, while the difference between the values remained the same, the value at the minimum-value detector $PD_{MIN}$ became zero, the formulas given above for the optimised additional play-out delay $\Delta T$ simplify to, respectively:

$$\Delta T=PD_{MAX}\cdot M$$

and $$\Delta T=PD_{MAX}+N.$$

Various procedures are conceivable for actually setting the additional play-out delay which is calculated. For example, the preset intervals of time at which the data packets 1 are played out of the jitter buffer 10 may be increased to obtain an increase in the play-out delay. Conversely, the preset intervals of time at which the data packets 1 are played out of the jitter buffer 10 may be reduced to obtain a reduction in the additional play-out delay $\Delta T$.

The method ends at the end point 160.

Figure 3B:
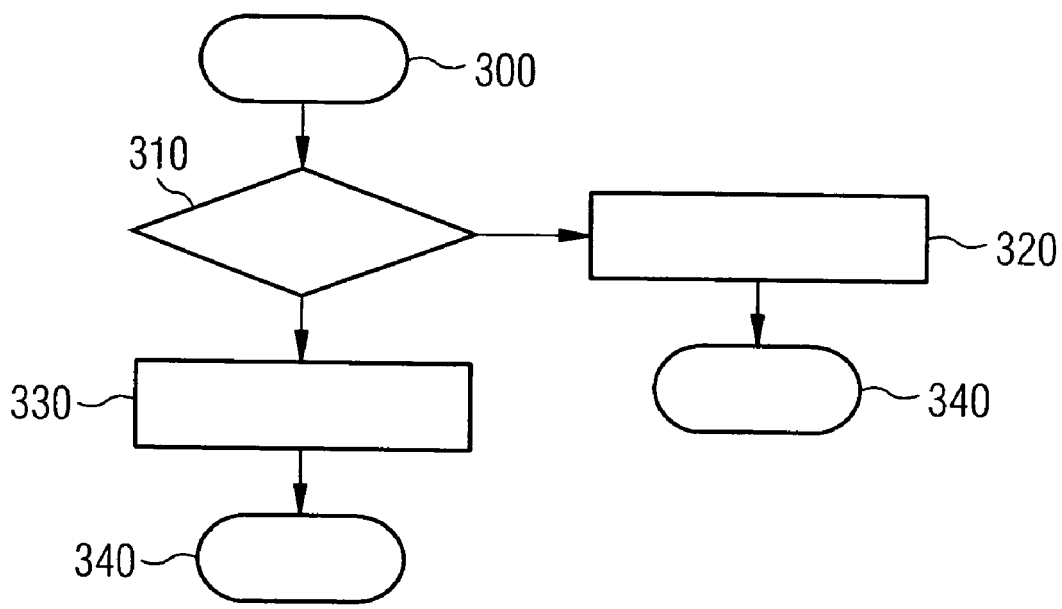

FIG. 3 illustrates implementations of the maximum-value detector $PD_{MAX}$ and the minimum-value detector $PD_{MIN}$, with FIG. 3(a) relating to the maximum-value detector $PD_{MAX}$ and FIG. 3(b) to the minimum-value detector $PD_{MIN}$.

A method as shown in FIG. 3(a) of adjusting the value at the maximum-value detector $PD_{MAX}$ starts, when a fresh data packet 1 has arrived at the jitter buffer 10, at the starting point 200. In a comparison step 210, a check is made to see whether the new value determined for the integrated value $I_{PPDV}$ of the differences in delay is equal to or greater than the instantaneous value at the maximum-value detector $PD_{MAX}$. If it is, the method continues with a calculating step 220. If it is not, the method continues with a calculating step 230.

In the calculating step 220, the value at the maximum-value detector $PD_{MAX}$ is set to the newly determined value of the integrated value of the differences in delay. In the event of there being a new maximum extreme value of the integrated value $I_{PPDV}$ of the differences in delay, the said extreme value is thus at once adopted as the new value at the maximum-value detector $PD_{MAX}$.

In the calculating step 230, the value at the maximum-value detector $PD_{MAX}$ is reduced by a value which corresponds to the difference, as scaled by a factor α, between the instantaneous value at the maximum-value detector $PD_{MAX}$ and the integrated value $I_{PPDV}$ of the differences in delay:

$$PD_{MAX}:=PD_{MAX}-\alpha(PD_{MAX}-I_{PPDV})$$

This ensures that, in the event of a new extreme value of the integrated difference in delay $I_{PPDV}$ not being detected, the value at the maximum-value detector $PD_{MAX}$ is corrected, i.e. is reduced with time. In this way, it is ensured that what is detected by the maximum-value detector $PD_{MAX}$ is not the absolute maximum extreme value of the integrated value $I_{PPDV}$ of the differences in delay but a relative extreme value which occurred within a given period of time. The factor α in this case sets how fast the value at the maximum-value detector $PD_{MAX}$ becomes equal to the instantaneous value of the integrated value $I_{PPDV}$ of the differences in delay if a new extreme value of the integrated value $I_{PPDV}$ of the differences in delay is not detected.

The method ends in each case at the end point 240.

Basically, a method as shown in FIG. 3(b) of adjusting the value at the minimum-value detector $PD_{MIN}$ corresponds to the method which has been explained by reference to FIG. 3(a) of adjusting the value at the maximum-value detector $PD_{MAX}$.

The method starts, when a fresh data packet 1 has arrived at the jitter buffer 10, at the starting point 300. Then, in a comparison step 310, a check is made to see whether the new value determined for the integrated value $I_{PPDV}$ of the differences in delay is equal to or less than the instantaneous value at the minimum-value detector $PD_{MIN}$. If it is, the method continues with a calculating step 320. If it is not, the method continues with a calculating step 330.

In the calculating step 320, the value at the minimum-value detector $PD_{MIN}$ is set to the newly determined integrated difference in delay $I_{PPDV}$. In the event of the integrated difference in delay $I_{PPDV}$ changing to a new minimum extreme value, the said new extreme value is thus at once adopted as the new value at the minimum-value detector $PD_{MIN}$.

In the calculating step 330, the value at the minimum-value detector $PD_{MIN}$ is increased by an amount which corresponds to the difference, as scaled by a factor β, between the integrated difference in delay $I_{PPDV}$ and the instantaneous value at the minimum-value detector $PD_{MIN}$:

$$PD_{MIN}:=PD_{MIN}+\beta\cdot(I_{PPDV}-PD_{MIN})$$

This ensures that, in the event of a new extreme value of the integrated value $I_{PPDV}$ of the differences in delay not being detected, a correction of the value at the minimum-value detector $PD_{MIN}$, i.e. an increase in the value at the minimum-value detector $PD_{MIN}$ with time, is effected. This in turn ensures that what is detected by the minimum-value detector $PD_{MIN}$ is not the absolute minimum extreme value of the integrated value $I_{PPDV}$ of the differences in delay but a relative minimum extreme value which occurs within a given period of time.

The method ends in each case at the end point 340.

The severity of the correction of the value at the maximum-value detector $PD_{MAX}$ and the value at the minimum-value detector $PD_{MIN}$ can thus be set by the factors α and β respectively. Whereas new extreme values at the maximum-value detector $PD_{MAX}$ and the minimum-value detector $PD_{MIN}$ can be adopted immediately, i.e. with a small time constant, the factors α and β set respective time constants with which the value at the maximum-value detector $PD_{MAX}$ decreases and the value at the minimum-value detector $PD_{MIN}$ increases.

These time constants, i.e. the factors α and β, are matched to an expected value for spacings in time between phases of increased delay jitter on the data network. What is more, the time constants of the maximum-value detector $PD_{MAX}$ and the minimum-value detector $PD_{MIN}$ are set, by means of the respective factors α and β, in such a way that the detectors are able to follow a drift of the respective extreme values, due for example to differences in timing between the transmitter and receiver, at a sufficiently fast rate.

New values for the maximum-value detector $PD_{MAX}$ and the minimum-value detector $PD_{MIN}$ are in each case accepted only when a fresh data packet 1 has arrived at the jitter buffer and it has thus also been possible to determine a new value for the integrated value $I_{PPDV}$ of the differences in delay. When there are phases in which no data packets 1 are communicated, e.g. when there are pauses in speech in an IP telephony application, this stops the additional play-out delay ΔT from being set, by the correction of the values at the maximum-value detector $PD_{MAX}$ and the minimum-value detector $PD_{MIN}$, to a value which is too low to be permitted and which, in particular, no longer represents the delay jitter on the data network.

Figure 4:
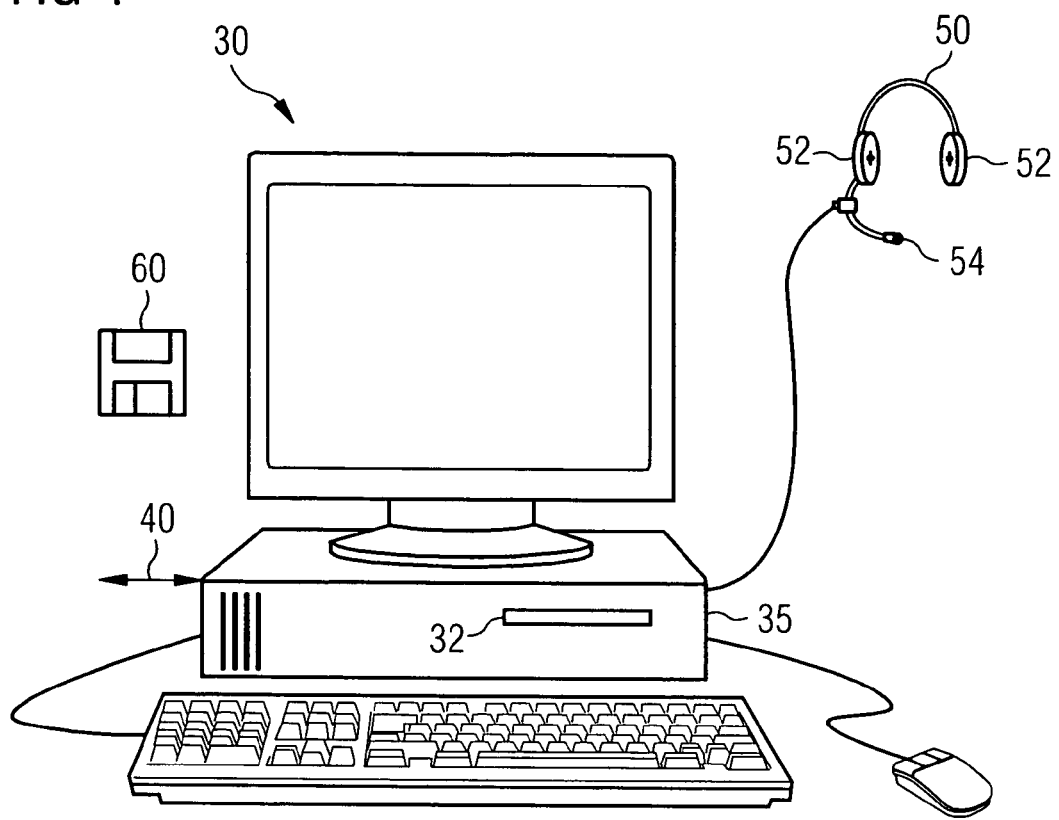
FIG. 4 shows a computer system which can be used in the context of a data-network-based telephony application and which is arranged to compensate for delay jitter in accordance with the embodiment shown in FIGS. 1-3.

FIG. 4 shows a computer system 30 which can be employed for use in a data-network-based telephony application. This may for example be a telephony application over an IP-based data network. The computer system 30 has data-processing means 35 which include storage means which are used as the jitter buffer 10 in the compensation for jitter in the delay of received data packets. The computer system 30 has an interface via which it is connected to the transmission link 40, i.e. to the data network.

The computer system 30 runs a program code which causes the compensation for the jitter in the delay of data packets received over the data network to be effected by the method which has been described by reference to FIGS. 1-3. The program code, or corresponding electronically readable control signals, may be fed to the computer system via, for example, a computer software product in the form of a data carrier 60 which can be read in an appropriate reading device 32. The data packets 1 received by the computer system 30 are converted by the decoder 20, which may likewise be implemented by means of suitable software, into speech data which is then emitted via an input/output means 50 for speech data. For this purpose, the input/output means 50 for speech data comprises output means in the form of loudspeakers 52. Also provided is an input means in the form of a microphone 54 by which speech data can be fed in. The computer system 30 is thus so arranged that speech data can also be entered into the computer system 30 and can be transmitted via the transmission link 40, in the form of data packets, to the transmitter or to another receiver. In particular, the computer system 30 is thus so arranged that two-way communication of speech data is possible.

The arrangement which was described by reference to FIG. 1 may however also be used, in conjunction with the method described above of compensating for delay jitter, in other devices, such for example as in an IP telephone specifically designed for data-network-based telephony applications.

The invention claimed is:

1. A method of compensating for jitter in the delay of data packets, comprising the steps of:
   storing in a buffer data packets communicated over a transmission link,
   retrieving the stored data packets out of the buffer at preset intervals of time, after an additional delay,
   determining delay differences of the data packets, the delay differences relative to respective preceding data packets, integrating the delay differences to obtain an integrated delay difference by summing the determined delay differences, wherein the integrated delay difference (IPPDV) is determined upon reception of a new data packet using the relationship IPPDV:=IPPDV+PPDV, wherein PPDV represents a delay difference value determined for the received new data packet, and setting the additional delay as a function of the integrated delay difference.

2. The method according to claim 1, further comprising the step of:

determining the delay differences of the data packets based on information related to relative arrival times of consecutive data packets.

3. The method according to claim 1, further comprising the step of:

determining the delay differences of the data packets based on total delays of consecutive data packets over the transmission link.

4. The method according to claim 1, further comprising the steps of:

detecting a minimum and a maximum extreme value for the integrated delay difference, and setting the additional delay of the data packets as a function of the minimum and maximum extreme values.

5. The method according to claim 1, further comprising the steps of:

obtaining a minimum limit value and selecting a maximum limit value, adopting a new minimum limit value if the integrated delay difference is below a current minimum limit value;

adopting a new maximum limit value detector if the integrated delay difference is above a current maximum limit value, and setting the additional delay as a function of the new maximum limit value and the new minimum limit value.

6. The method according to claim 5, further comprising the step of:

setting the additional delay as a function of a difference between the new maximum limit value and the new minimum limit value.

7. The method according to claim 5, further comprising the steps of:

generating an increased difference value by adding a set amount to a value representative of the difference between the new maximum limit value and the new minimum limit value; and setting the additional delay as a function of the increased difference value.

8. The method according to claim 5, further comprising the steps of:

generating an increased difference value by applying a multiplicative factor to a value representative of the difference between the new maximum limit value and the new minimum limit value; and setting the additional delay as a function of the increased difference value.

9. The method according to claim 5, further comprising the step of:

applying a correction value to the integrated delay difference, the minimum limit value and the maximum limit value, the correction value selected such that the minimum limit value is set to zero.

10. The method according to claim 5, further comprising:

changing the minimum limit value pursuant to a first time constant if the integrated delay difference is below the current minimum limit value, and increasing the minimum limit value pursuant to a second time constant, which is larger than the first time constant, if the integrated delay difference is not below the current minimum limit value.

11. The method according to claim 5, further comprising:

changing the maximum limit value pursuant to a first time constant if the integrated delay difference is above the current maximum limit value, and decreasing the maximum limit value pursuant to a second time constant, which is larger than the first time constant, if the integrated delay difference is not above the current maximum limit value.

12. The method according to claim 10, further comprising the step of:

changing the minimum limit value immediately if the integrated delay difference is below the current minimum limit value.

13. The method according to claim 5, further comprising the step of:

changing the minimum limit value and/or the maximum limit value at regular intervals of time.

14. The method according to claim 5, further comprising the step of:

changing the minimum limit value and/or the maximum limit value only if a fresh data packet has been received.

15. The method according to claim 1, wherein a starting value of the integrated delay difference is zero.

16. The method according to claim 1, wherein the transmission link is part of a data network and the data packets contain speech data which is communicated over the network.

17. A computer readable medium encoded with instructions for controlling a computer system configured to compensate for jitter in the delay of data packets, by:

storing in a jitter buffer data packets communicated over a transmission link, retrieving the stored data packets out of the jitter buffer at preset intervals of time, after an additional delay, determining delay differences of the data packets, the delay difference relative to respective preceding data packets, integrating the delay differences to obtain an integrated delay difference by summing the determined delay differences, wherein the integrated delay difference (IPPDV) is determined up on reception of a new data packet using the relationship IPPDV:=IPPDV+PPDV, wherein PPDV represents a delay difference value determined for the received new data packet, and setting the additional delay as a function of the integrated value of the delay differences.

18. An arrangement for compensating for jitter in the delay of data packets, comprising:

a memory element configured to store data packets received over a transmission link, the arrangement being arranged such that the stored data packets are retrieved out of the memory element at preset intervals of time, after an additional delay, and a control device configured to determine a value representative of differences in delay of the data packets relative to respective preceding data packets, to integrate the value representative of differences in delay in order to obtain an integrated delay difference by summing the determined delay differences, and to set the additional delay as a function of the integrated delay difference, wherein the integrated delay difference (IPPDV) is determined upon reception of a new data packet using the relationship IPPDV:=IPPDV+PPDV, wherein PPDV represents a delay difference value determined for the received new data packet.

19. The arrangement of claim 18, wherein the memory element is a data buffer.

* * * * *